Nov. 21, 1950
J. T. HECK ET AL
2,530,878
OPERATING HANDLE AND SCREEN CASING SUPPORT
FOR PORTABLE PICTURE SCREENS
Filed Oct. 25, 1947
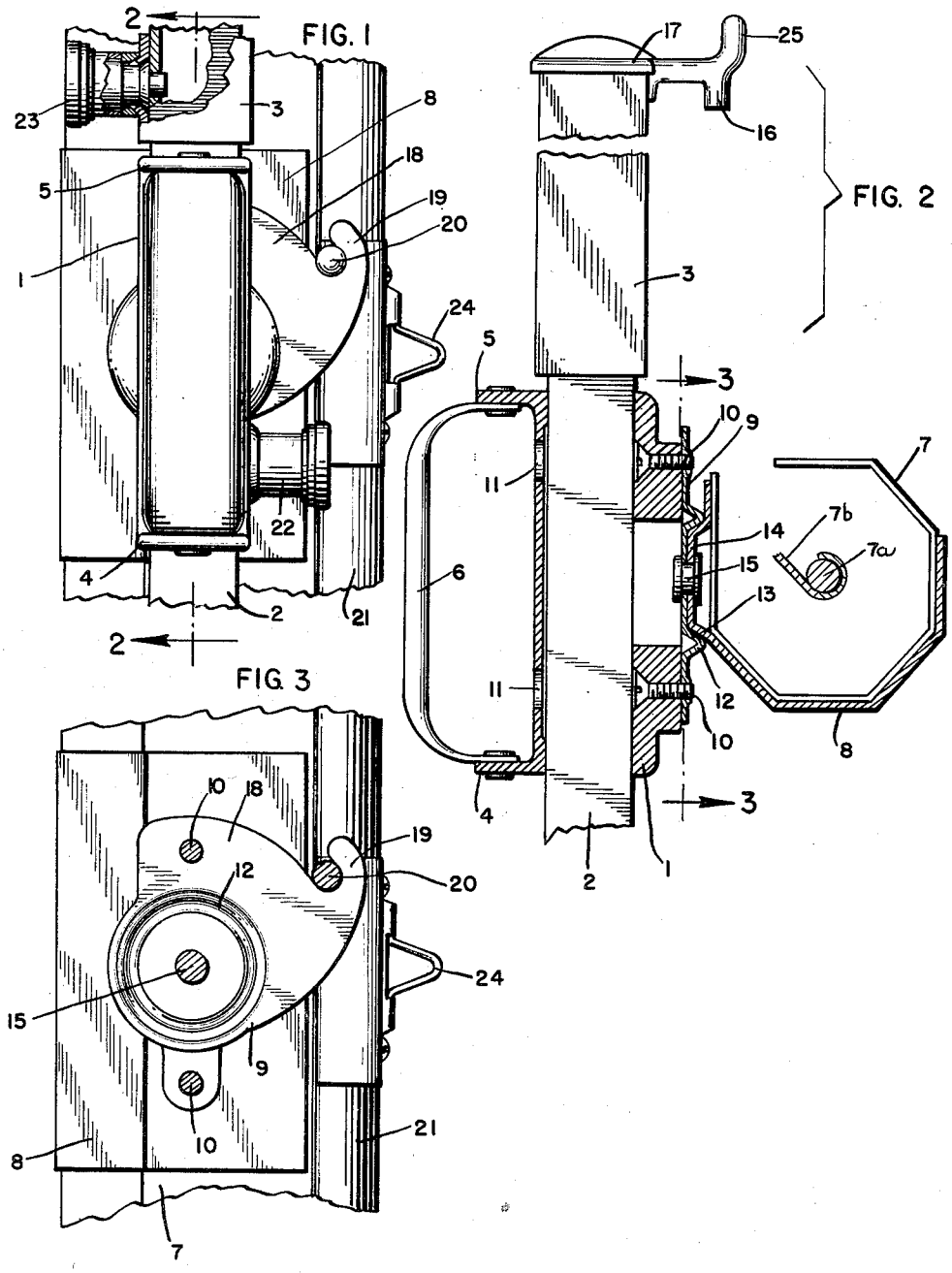
INVENTORS
JOHN T. HECK
LEO J. DU MAIS
CURTIS O. TALBOT
BY *Rummler, Rummler and Snow*
ATTORNEYS

Patented Nov. 21, 1950

2,530,878

UNITED STATES PATENT OFFICE 2,530,878

OPERATING HANDLE AND SCREEN CASING SUPPORT FOR PORTABLE PICTURE SCREENS

John T. Heck, Elmhurst, and Leo J. Du Mais and Curtis O. Talbot, Chicago, Ill., assignors to Da-Lite Screen Company, Inc., Chicago, Ill., a corporation of Illinois Application October 25, 1947, Serial No. 782,204

10 Claims. (Cl. 160—24)

This invention relates to portable screens for projection pictures and particularly to an improved operating rider for the telescoping elements of the screen standard, which rider also serves as a support for the screen casing and as a means for aligning the casing with the screen standard when it is folded to storage position.

This invention is disclosed in our co-pending application Serial No. 782,202 filed Oct. 25, 1947, and the present application is a continuation in part of the said co-pending application.

The main objects of this invention are to provide an improved sliding rider or operating means for collapsible screen standards to facilitate extension of the telescoping standard elements; to provide such a device that will serve as a shiftable screen casing support and facilitate vertical adjustment of the screen casing on a telescoping standard; to provide an improved screen standard rider and screen casing support arranged to permit rotation of the screen casing in a vertical plane and provide an automatic stop means to hold the screen casing in a position aligned with the screen standard when it is folded for storage; and to provide such a device of more simple construction and easy operation.

A specific embodiment of this invention is shown in the accompanying drawings in which:

Figure 1 is a rear view in elevation showing the improved screen casing support and rider, the telescoping members of the screen standard, on which the rider is mounted, and the screen casing being partially broken away.

Fig. 2 is a view of the same in side elevation partly sectioned as on line 2—2 of Fig. 1 the screen being omitted and the casing being shown in horizontal position.

Fig. 3 is a partly sectioned view as taken on line 3—3 of Fig. 2 to show the screen casing aligning bracket construction, the casing being shown in vertical position aligned with the standard as in Fig. 1.

As described in our before-mentioned, co-pending application, Serial No. 782,202, the improved rider and screen casing carrier is intended to be slidably mounted on the center member of a telescoping screen standard, the elements of which telescope into each other in order to fold or collapse the screen standard for storage and carrying purposes.

Details of the telescoping screen standard are not shown. However, the standard comprises a center member which telescopes into a bottom tube and which extends upwardly therefrom to receive a top tube which is telescopingly fitted over the center member, and such standard is extended by first slidably raising the top tube to its maximum position of extension on the center member and then raising the center member from the bottom tube until it reaches the desired position of extension.

The herein described rider is intended to be slidably fitted on the center member of such a screen standard and serves not only as a carrier for the screen casing and an operating means for shifting the center member from the bottom tube to position the center of the screen at the desired level, but also as a means to shift the screen casing along the center member to adjust its effective size or area.

In the form shown in the drawings, the operating means or rider comprises a hollow body 1 having a central passage extending longitudinally therethrough to receive and slidably fit the center member 2 of the screen standard, the top tube 3 of the standard being telescopingly fitted over the center member and in its collapsed position resting with its bottom end spaced a short distance above the upper end of the rider body 1. As shown, the rear side of the rider body 1 is provided with a pair of projecting ears or lugs 4 and 5 between which a handle 6 is mounted, the ends of the handle 6 being pivotally connected to the ears 4 and 5 so that the handle can be folded sidewise when not in use.

The opposite side of the rider body 1 is arranged for mounting a screen casing 7 which is adapted to contain a spring roller 7a and the screen 7b. The screen casing 7 is provided with a center band 8 which is fastened to the casing and which provides a means by which the casing is supported from the rider 1.

As shown, a mounting plate 9 is secured to the rider body 1 by means of screws 10 which extend outwardly from the interior of the body 1 through one side thereof and have threaded engagement with suitable tapped openings in the mounting plate 9, the opposite sidewall of the body 1 being provided with openings 11 through which the screws may be manipulated as by means of a screwdriver.

The mounting plate 9 is provided with an annular rib 12 which projects outwardly from the rider body 1 and which provides an annular seat or socket 13 in which a boss or projecting portion 14 of the screen casing center band or bracket 8 may be received and seated, the boss 14 being formed to closely fit into the socket or seat 13 of the mounting plate. The center band 8 is pivotally secured to the mounting plate 9 by means of a rivet 15 located at the center of the seat 13, and, the seat being annular, the screen casing center band is rotatable in the seat 13. The parts are snugly fitted together and the rivet 15 is sufficiently tight to provide frictional engagement between the boss 14 and the seat 13, and the annular rib 12 serves to stiffen the joint and provide support to minimize any tendency to wobble.

Thus the screen casing 7 which extends laterally on either side of the casing center band 8 is securely supported on the rider body 1 and is rotatable in a vertical plane so that it may be positioned either vertically or horizontally. The operative position for the screen casing is horizontal. However, it is desirable that, when not in use, the screen be turned to vertical position so that it may be stored parallel with the screen standard and a means is provided to automatically position the screen casing so that it will be exactly parallel with the standard when folded, the purpose being to permit the uppermost end of the screen casing to be engaged with a holding pin 16 extending downwardly from a gooseneck projection on a cap 17 mounted on the top end of the uppermost standard tube 3.

Such an aligning means for the screen casing is provided by forming a flange-like extension 18 on the mounting plate 9, which extension is located in the upper left hand quadrant of the mounting plate when viewed from the screen casing side, and by providing a marginal hook-like portion 19 positioned to engage a fixed pin 20 which, in the form shown, projects outwardly from the top slat 21 of the screen contained in and carried by the screen casing.

The flange-like portion 18 is arcuate in shape and its periphery is concentric with the axis of rotation of the screen casing 7 on its pivot 15 so as to provide a guide for the pin 20 to lead the pin into the seat formed by the hook portion 19. Thus when the pin 20 is seated the screen casing will be in exactly vertical position for locking engagement with the holding pin 16 and the top slat 21 of the screen will be secured against inadvertent unrolling of the screen.

As shown in Fig. 1, the rider body is provided with a spring lock 22 comprising a spring actuated pin adapted to project into an aperture in the center member 2 on which the rider slides, the function of the spring lock being to lock the rider to the center member 2 at certain pre-determined positions therealong where suitable apertures in the center tube wall are provided. Also, the top tube 3 of the standard is provided with a similar spring lock 23 whereby the top tube can be locked in its telescoped position or in its extended position along the center member 2.

In the operation of the device, the screen standard being vertical the screen casing 7 is first placed in a horizontal position and the top slat 21 of the screen is then lifted to partially withdraw the screen from its casing and its bale 24 is hooked over the hook 25 on the gooseneck portion of the cap 17 of the top tube 3. Then the top tube is extended by sliding the same upwardly along the center member, the lock pin 23 having been first pulled out to disengage the top tube from the center tube and the top tube being grasped at its lower end by the hand of the operator and lifted. During this last operation, the screen is fully extended from the screen casing 7 to provide a screen area of normal shape and size for picture projection purposes and the top tube 3 is automatically locked in its extended position by means of its spring lock 23 engaging in a suitably located aperture in the center tube wall.

The rider 1, which is normally secured to the center member 2 by the lock pin 22, is then lifted by means of its handle 6 to extend the center member from the bottom tube to locate the height or level of the screen center at the desired position. A third spring lock, not shown, is provided in the bottom tube to coact with suitably spaced openings in the center member and hold the center member at the desired position of extension.

When it is desired to increase the effective screen area, or change the shape of the screen from oblong to square, the rider locking pin 22 is released and the rider is shifted downwardly along the center member thus causing the screen to further unroll from the casing. This operation is done after the level of the screen center has been adjusted and the rider is locked in its new position by means of its lock pin 22 engaging in a suitably located aperture in the wall of the center member.

When it is desired to collapse the apparatus for storage purposes, the center member 2 is lowered, by means of the rider, until it is fully telescoped into the bottom tube, the rider having been first returned to its normal location on the center member. Then the locking pin or spring lock 23 for the top tube 3 is disengaged and the top tube is lowered manually until it is in its completely telescoped position over the center member. During this operation the screen is automatically rolled about half way into its casing by the usual spring actuated screen roller. The bale 24 is then disengaged from the hook 25 and the screen is allowed to roll completely into the casing after which the casing is turned about the rivet or horizontal pivot 15 until it reaches a vertical position aligned with the screen standard, this vertical position being determined by engagement of the pin 20, projecting from the top slat of the screen, against the hook portion 19 of the mounting plate flange 18. The upper end of the screen casing, which is not shown, is then engaged with the securing pin 16 by simply lifting the top tube along the center member 2 to clear the end of the casing and then lowering the top tube to engage the pin 16 in a suitable aperture in the end of the casing. When in its normal telescoped position the top tube is locked to the center member 2 by means of the lock pin 23, thus the casing holding pin 16 can not become disengaged from the end of the casing until the pin 23 is first released and the top tube is lifted.

The main advantages of this invention reside in the simple construction and arrangement of the rider for pivotally mounting the screen casing and for facilitating adjustment of the level or height of the screen center. A further advantage resides in the simple arrangement for automatically aligning the screen casing in a position parallel with the screen standard, for quickly securing the casing by its top end, and simultaneously securing the top slat of the screen, when the casing is in its folded position, so that screen can not inadvertently be unrolled from the casing. Further advantages are to be found in the simple arrangement for pivotally mounting the screen casing on the rider so that the casing is firmly held when in either its vertical or horizontal positions.

Still further advantages will be found in that the rider, because of its location on the center member of the screen standard, may also provide a carrying handle for both the screen standard and screen casing, when the apparatus is in collapsed or portable condition.

Although but one specific embodiment of this invention is herein shown and described, it will be understood that details of the construction shown may be altered or omitted without departing from the spirit of this invention as defined by the following claims:

We claim:

1. In a collapsible screen standard having a vertical screen support member, an operating means comprising a hollow body slidable on said member, lock means on said body for engaging said member at predetermined positions therealong, a screen casing pivotally mounted on said body and wholly supported thereby, and means on said body for stopping pivotal movement of said screen casing when the same is rotated to a position aligned with said support member.

2. In a collapsible screen standard having a vertical screen support member, an operating means comprising a hollow body slidable on said member, releasable lock means on said body engaging said vertical screen support member and holding said body fixed at selected positions thereon, a screen casing pivotally mounted on said body and containing a picture screen, a slat on said screen having a fixed pin projecting therefrom toward said body, and a flange member on said body extending radially from the pivot axis of said casing and having means for engaging said pin when said casing is rotated to a position aligned with said standard.

3. An operating rider for a screen standard comprising a hollow body fitting on the standard and shiftable therealong, a releasable lock means on said body engaging the standard and holding said body against shifting movement, a screen casing, pivot means for mounting said casing on one side of said body having an axis normal to said body, and stop means on said body for holding said screen casing aligned with the standard when said casing is rotated to a position parallel therewith.

4. An operating rider for a screen standard comprising a rigid hollow body fitting on the standard and shiftable therealong, said body being lockable to said standard, a screen casing, pivot means for mounting said casing on one side of said rider and having an axis normal to said rider, and mutually interfitting annular seat and boss portions on said screen casing and said rider concentric with the pivot connection therebetween, said seat and boss portions being held together by said pivot means.

5. An operating rider for a screen standard comprising a rigid hollow body fitting on the standard and shiftable therealong, a releasable lock means on said body for engaging the standard and holding said body against shifting movement, a screen casing, pivot means for mounting said casing on one side of said rider and having an axis normal to said rider, interfitting annular seat and boss portions on said screen casing and said handle concentric with the pivot connection therebetween and secured together by said pivot means, and stop means on said rider for positioning and holding said screen casing aligned with the standard when said casing is rotated about said pivot means to a position parallel with said standard.

6. An operating rider for a screen standard comprising a hollow body fitting on the standard and slidable therealong, said body being lockable to said standard, a mounting plate on said body, a screen casing, pivot means for securing said casing on said mounting plate and having an axis normal to said casing, and mutually interfitting annular seat and boss portions on said screen casing and mounting plate concentric with said pivot means and secured together thereby.

7. An operating rider for a screen standard comprising a hollow body fitting on the standard and slidable therealong, releasable lock means on said body to engage said standard and hold said body against sliding movement, a mounting plate on said body, a screen casing, pivot means for securing said casing on said mounting plate and having an axis normal to said casing, mutually interfitting annular seat and boss portions on said screen casing and mounting plate concentric with the pivot connection therebetween, a fixed pin carried by said screen casing and projecting toward said mounting plate, said pin being disposed radially outward relative to the axis of said pivot connection, and a flange portion extending laterally from said mounting plate and having a hook portion thereon engaging said pin when said screen casing is rotated to a position parallel with the standard.

8. An operating rider for a screen standard comprising a hollow body fitting on the standard and shiftable therealong, said body being lockable to said standard, a mounting plate on said body having an annular seat in the outer face, a screen casing, pivot means for securing said casing on said mounting plate at the center of said seat and having an axis normal to said casing, and an annular boss on said screen casing extending into and rotatably fitting said seat, said seat and boss being held together by said pivot means.

9. An operating rider for a screen standard comprising a hollow body fitting on the standard and shiftable therealong, said body being lockable to said standard, a mounting plate on said body having an annular rib projecting from its outer face to provide a circular seat, a screen casing having a centrally disposed annular boss closely fitted into said seat, and pivot means at the center of said seat for securing said boss in said seat and having an axis normal to said casing.

10. An operating rider for a screen standard comprising a hollow body fitting on the standard and shiftable therealong, a releasable lock means on said body to engage the standard and hold said body against movement thereon, a mounting plate on said body having an annular seat in its outer face, a screen casing, a pivot means on said casing for securing said mounting plate at the center of said seat having an axis normal to said casing, an annular boss on said screen casing extending into and rotatably fitting said seat, a fixed pin carried by said casing and disposed radially outward relative to the axis of said pivot connection and projecting toward said mounting plate, and a flange portion extending from said mounting plate radially from the axis of said pivot connection and having a marginal seat engaging said pin when said screen casing is rotated to a position parallel with the standard.

JOHN T. HECK.
LEO J. DU MAIS.
CURTIS O. TALBOT.

REFERENCES CITED

The following references are of record in the file of this patent:

UNITED STATES PATENTS

| Number | Name | Date |
|---|---|---|
| 2,042,443 | Buckstone | May 26, 1936 |
| 2,361,119 | Owens | Oct. 24, 1944 |
| 2,377,553 | Heck | June 5, 1945 |
| 2,434,071 | Heck | Jan. 6, 1948 |